Jan. 27, 1953  A. A. BROWN  2,626,989
COMPARATIVE PHOTOMETER
Filed Oct. 28, 1948  6 Sheets-Sheet 1
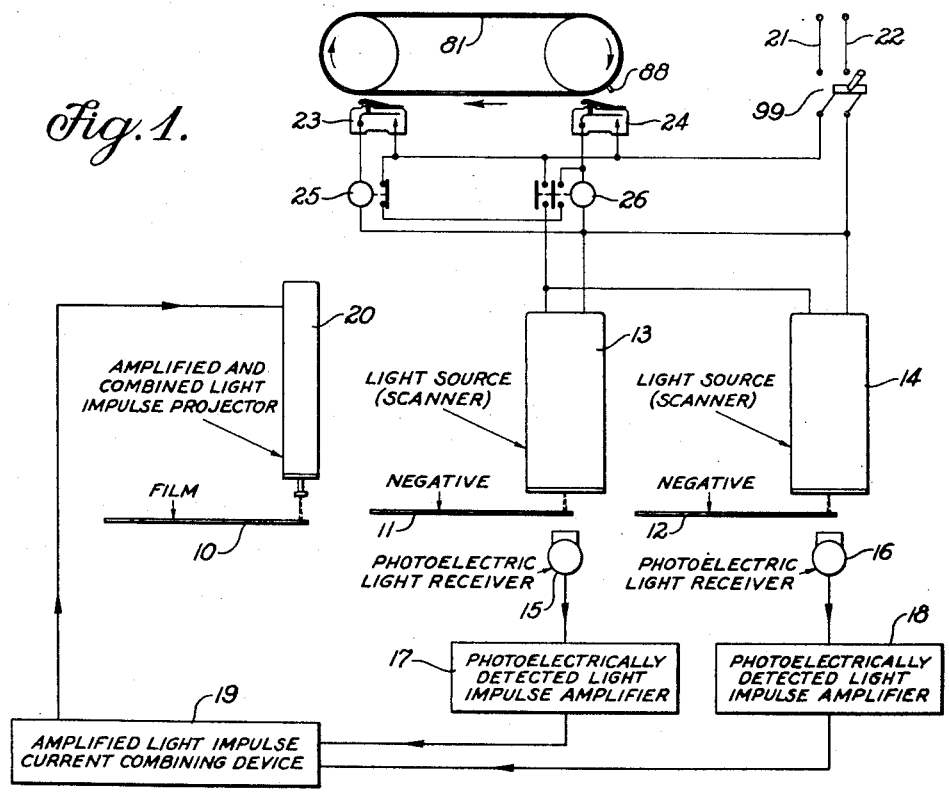
Fig. 1.
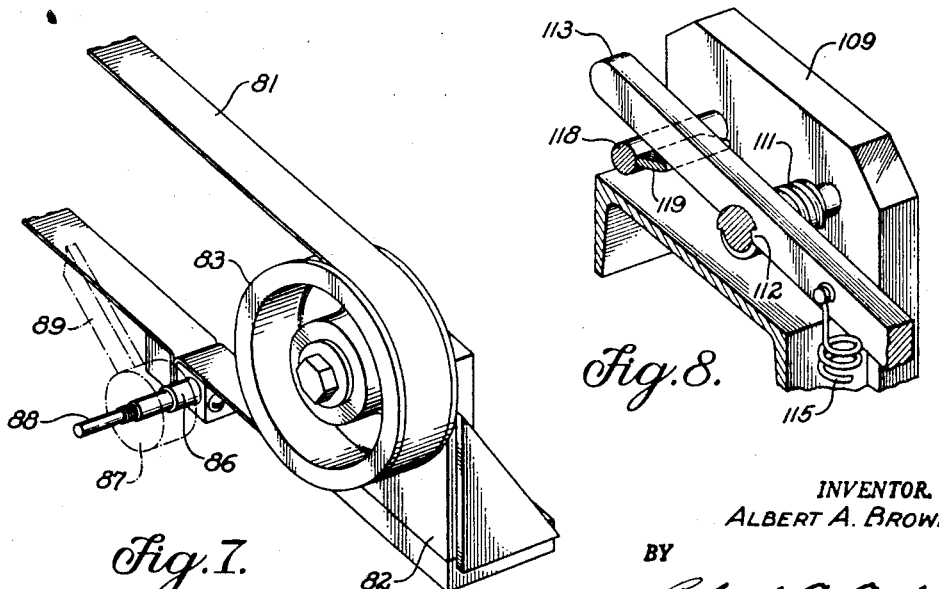
Fig. 7.
Fig. 8.
INVENTOR.
ALBERT A. BROWN
BY
Roland A. Anderson
ATTORNEY.

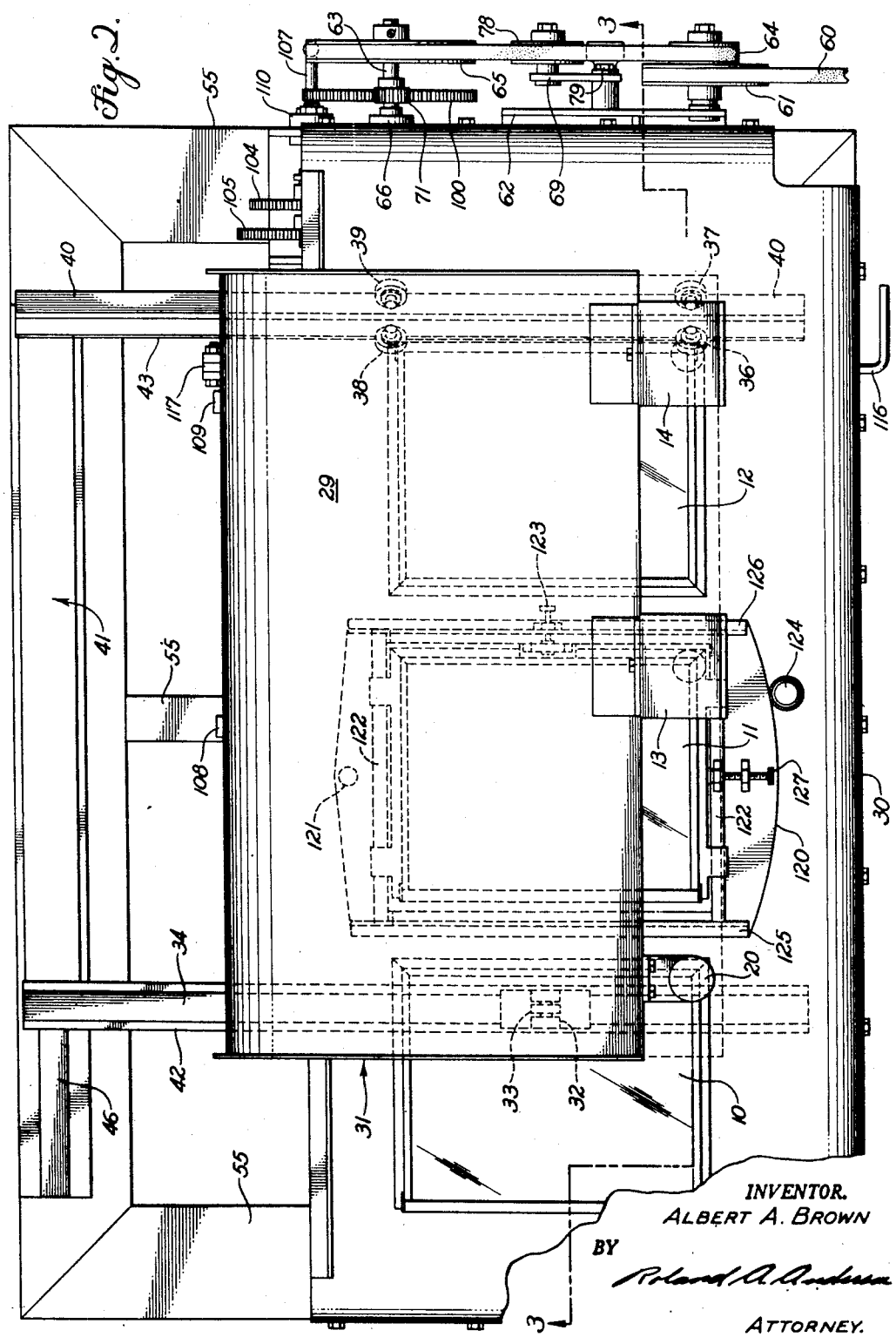

Jan. 27, 1953     A. A. BROWN     2,626,989
COMPARATIVE PHOTOMETER

Filed Oct. 28, 1948     6 Sheets-Sheet 3

INVENTOR.
ALBERT A. BROWN
BY
Roland A. Anderson
ATTORNEY.

Jan. 27, 1953 A. A. BROWN 2,626,989
COMPARATIVE PHOTOMETER
Filed Oct. 28, 1948 6 Sheets-Sheet 4

INVENTOR.
ALBERT A. BROWN
BY
Roland A. Anderson
ATTORNEY.

Jan. 27, 1953     A. A. BROWN     2,626,989
COMPARATIVE PHOTOMETER
Filed Oct. 28, 1948     6 Sheets-Sheet 5
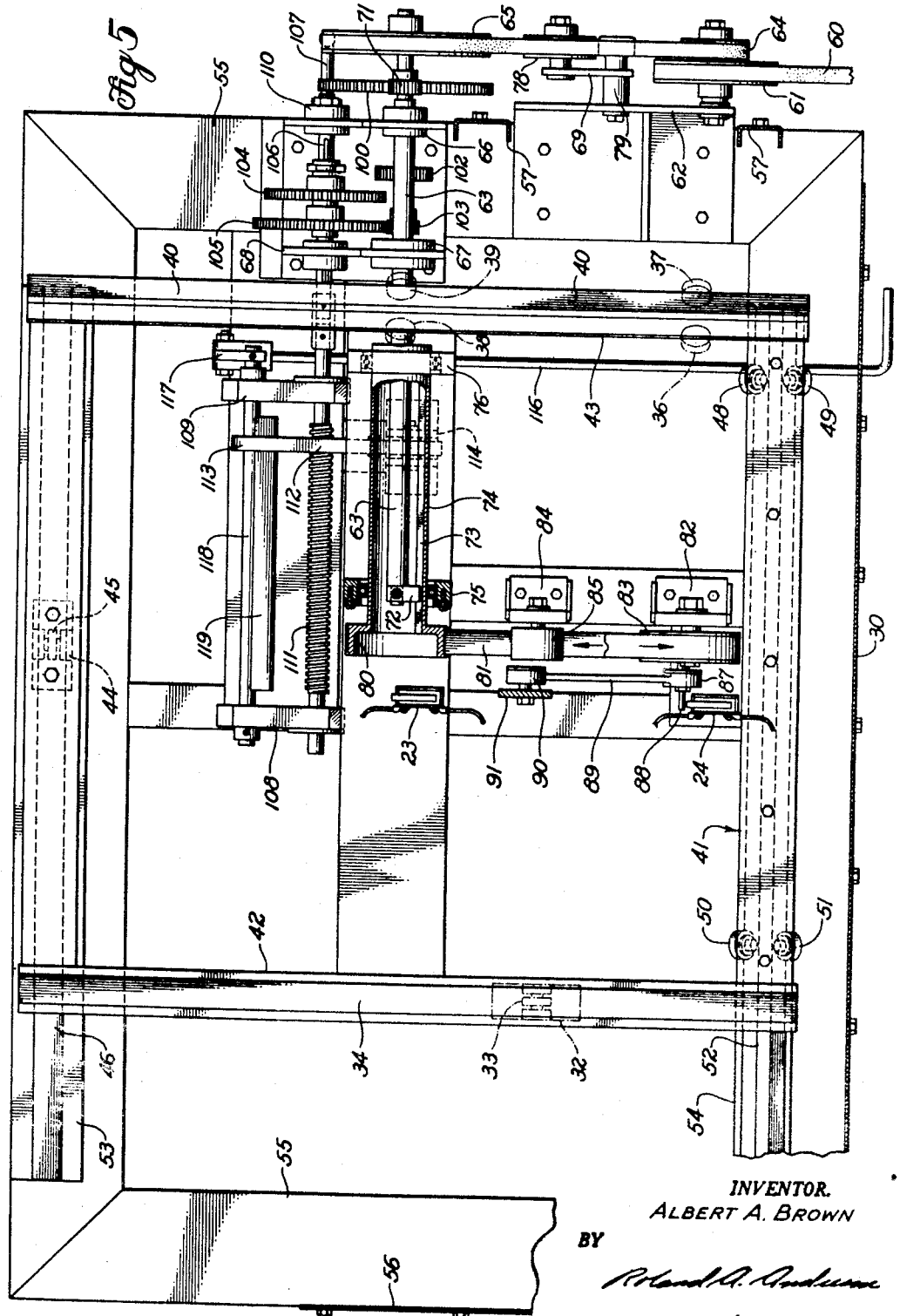
INVENTOR.
ALBERT A. BROWN
BY
ATTORNEY.

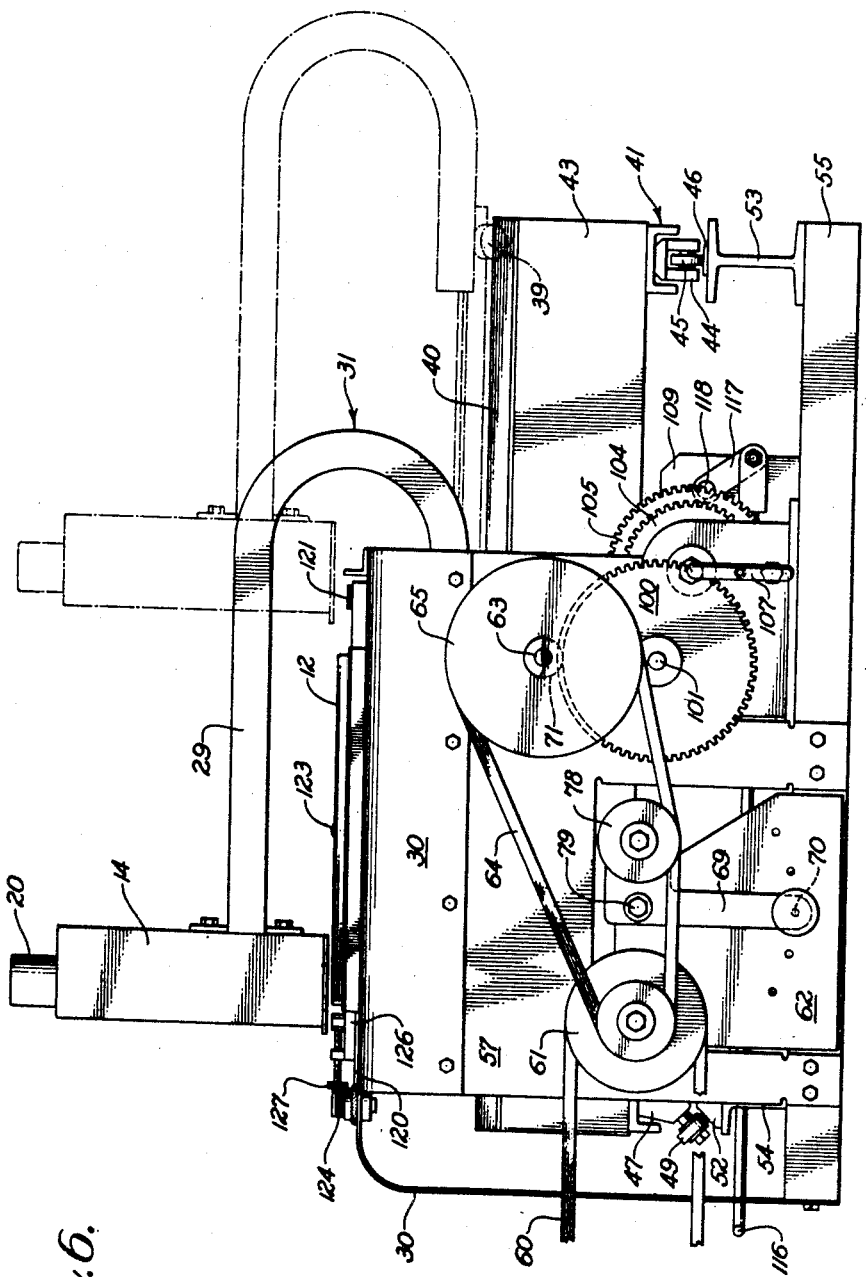

Patented Jan. 27, 1953

2,626,989

UNITED STATES PATENT OFFICE 2,626,989

COMPARATIVE PHOTOMETER

Albert A. Brown, Danville, Calif., assignor to the United States of America as represented by the United States Atomic Energy Commission Application October 28, 1948, Serial No. 56,930

12 Claims. (Cl. 178—6.7)

This invention relates to the art of photometry and more particularly to a new and improved method and apparatus for the making of a photograph, or other record of information, by the use of comparative photometry.

The art of photometry has taught, in general, that a plurality of objects may be scanned simultaneously with pencils of light cooperating with photoelectric receivers and the currents thereby produced may be transmitted with amplification to any suitable recording or measuring means. Moreover, these currents may be transmitted either subtractively or additively, as desired. Using a photographic apparatus as a recording means, it thus is possible to produce a photograph having a recorded image the density of any portion of which can be the difference between the densities of corresponding portions on two scanned photographic negatives, or for that matter, of any two scanned objects. Similarly, the photograph can also be made to record the sum rather than the difference of the densities of the scanned objects. As will be obvious to those skilled in the art, the term "negative" as used herein may comprise not only the usual photographic negative, but also various opaque objects, photo transparencies, positives or the like in so far as its cooperation with the several structural elements of the invention are concerned.

As one example of an important field in which the present invention may be employed, the radiographic visualization of treated portions of organs of the human body may be noted. For example, the organ to be observed may first be treated with iodine, or a salt which is selective for specified body organs, whereupon a radiograph may be made using an iodine or other suitable filter between the X-ray tube and the subject. Immediately thereafter, a second radiograph with the subject in the same position and with all other conditions similar is made while using a different filter, as for example, a barium filter. Negatives are made of the two radiograph films with the result that the densities of the two films at similar positions will provide an observable contrast. Thereafter, by means of comparative photometry, a photograph can be made showing clearly the treated portion of the organ in relation to its environment.

In utilizing known procedures of this type, however, much difficulty has been experienced in carrying out the operation since the accurate positioning of the several negatives and the required relative motion between the scanning means and the negatives has necessitated the use of complex, slow-moving, and expensive mechanical apparatus.

One of the objects of this invention is the provision of an improved method and apparatus for use in comparative photometry.

A second object is the provision of an improved apparatus for producing relative motion between a comparative photometry assembly and the objects to be scanned.

Another object is to provide an improved combination of electronic photometric apparatus, mechanical apparatus, and photographic images for the simple and rapid production of a photograph.

Another object is to provide an improved movable carriage substantially vibrationless for use in scanning photographic images.

Still another object is to provide an improved photographic negative adjusting means.

Another object is to provide an improved mounting means for a movable photometer carriage.

Another object is to provide an improved driving means for a movable photometer carriage.

Other objects and advantages of the invention will become more apparent when considered in connection with the accompanying drawings in which:

Figure 1 is a diagrammatic view showing one cooperative arrangement of photometric, mechanical, and photographic apparatus which may be employed in the process of the invention;

Fig. 2 is a plan view of one form of apparatus adapted to carry out the invention;

Fig. 5 is a sectional view taken on line 5—5 of Fig. 3;

Fig. 6 is a right elevation of the structure shown in Fig. 2;

Fig. 7 is a detail view showing one manner of mounting the upper carriage driving means, while Fig. 8 is a detail view partially broken away and showing the means for engaging or disengaging the lower carriage drive means.

Figure 3:
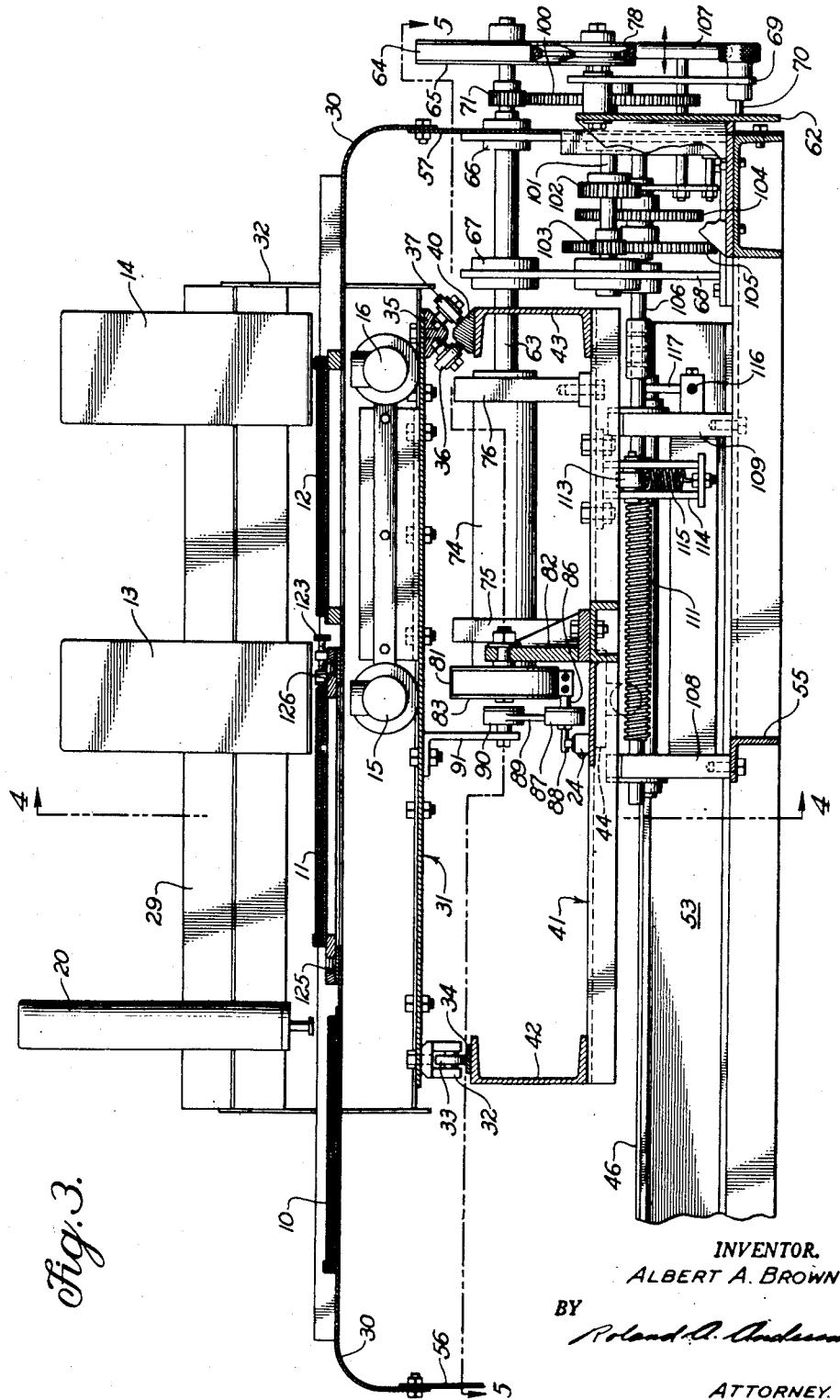
Fig. 3 is a sectional view taken on line 3—3 of Fig. 2, with the hood member attachments shown in elevation.

As diagrammatically shown in Fig. 1, a comparative photometry assembly of any conventional type which may be used with this invention employs an unexposed film 10 on which a photographic image is to be made. This film is mounted at a predetermined point with respect to a plurality of photographic negatives 11 and 12, although, as will be apparent to those skilled in the art, a single negative or more than two negatives could be used without departing from the scope of the invention. Negatives 11 and 12 are carefully positioned with respect to each other, in a manner later to be described, so that pencils of light directed simultaneously thereupon will strike at precisely the corresponding point on each negative. Positioned above each negative are conventional photometric means comprising light source scanners 13 and 14, respectively, while positioned below each negative are photoelectric light receivers 15 and 16, respectively. Amplifiers 17 and 18 receiving impulses from light receivers 15 and 16 amplify said impulses and feed into the amplified light impulse current combining device 19. This combining device may be either of the type which adds the current impulses received from the amplifiers or of the type which subtracts one impulse current from the other. Current fed from the combining device 19 passes to and actuates the amplified and combined light impulse projector 20 which in turn projects a variable light impulse on film 10.

By means of conductors 21 and 22 and switch 99, an electrical circuit is established and then interrupted through mechanical contact switches 23 and 24 and solenoid switches 25 and 26 with the adjustable light source scanners 13 and 14, whereby periodic pencils of light may be directed from those sources upon the negatives 11 and 12 in a manner later to be described.

As will be observed, the control of the necessary relative movement between the negatives and film on the one part and the scanners, light receivers, and light impulse projector on the other part, forms an important part of this invention, but for the present it will merely be noted that a movable mechanical means 81 including a switch contacting means 88, and driven in a predetermined manner, functions to make and break the circuit to the light source scanners.

Referring now to Fig. 3, it will be seen that film 10 and negatives 11 and 12 are preferably supported upon a stationary housing 30, while the scanners 13 and 14, photoelectric light receivers 15 and 16, and combined light impulse projector 20 are supported upon a movable carriage 31, adapted to move transversely of the general structure. A rigid curved hood structure 29 may conveniently be arranged for the support of the scanners and projector above the film and negatives, whereas the light receivers may conveniently be mounted in any suitable manner rigidly upon the movable carriage 31. The current combining device 19 as well as conventional wiring between the several parts of the electrical system may be located in any convenient position and the location thereof forms no essential part of the invention.

The movement of carriage 31 must be easily controlled, substantially vibrationless, and with a minimum of friction in order to insure the accuracy of operation required. Moreover, its movement must be capable of being adapted to the requirements of the photometric apparatus, as for example, a movement at substantially constant speed during the period in which the scanning is accomplished. With these requirements in mind, the invention provides a so-called "three point" suspension for this carriage shown generally in plan in Fig. 5 and in elevation in Fig. 3. As will be noted, the use of a minimum of three points of support serves to reduce frictional forces and is preferred. However, more than three points of support may be employed whenever desired without departing from the broader aspects of the invention. One form of construction may employ a single bracket 32 attached to the underside of the movable carriage adjacent one extreme edge thereof and supporting a substantially frictionless roller 33 adapted to roll along a track 34 running transversely of the general structure. Bracket 32 preferably is attached to the carriage in the region of the longitudinal center line thereof and provides one of the three point supports for said carriage. Adjacent the other extreme edge of the carriage 31, a transverse boss support 35 of generally triangular cross section may be affixed to the under side of the movable carriage. Mounted upon support 35 at spaced points near the transverse edges of the carriage 31 are two pairs of substantially frictionless rollers 36—37 and 38—39 respectively, providing the other two of the three point supports for the carriage. These rollers are adapted to roll along the opposite sides of a cooperating track 40 of triangular cross section extending transversely of the general structure and, as will be evident, vibration or relative movement of the carriage 31 in a direction longitudinally of the general structure as shown in Fig. 3 is thus prevented by engagement of one or the other pairs of rollers against an inclined track surface. This feature is of especial importance due to the inertia of the moving parts which otherwise would give a jarring effect to the carriage 31 at the extreme ends of the path of movement of a lower carriage now to be described.

Means for actuating the transversely movable carriage 31 will be described later, but at this point it is significant to note that the entire carriage 31, the hood 29, and the photoelectric light receivers, scanners and light impulse projector respectively carried thereby, are supported upon another movable carriage designated generally at 41 and which is adapted to move longitudinally of the general structure shown in Fig. 3. Carriage 41 may be constructed of any suitable structural elements, as, for example, the transverse channel members 42 and 43 serving to provide rigid supports for the tracks 34 and 40 upon which the transversely movable carriage 31 moves.

Figure 4:
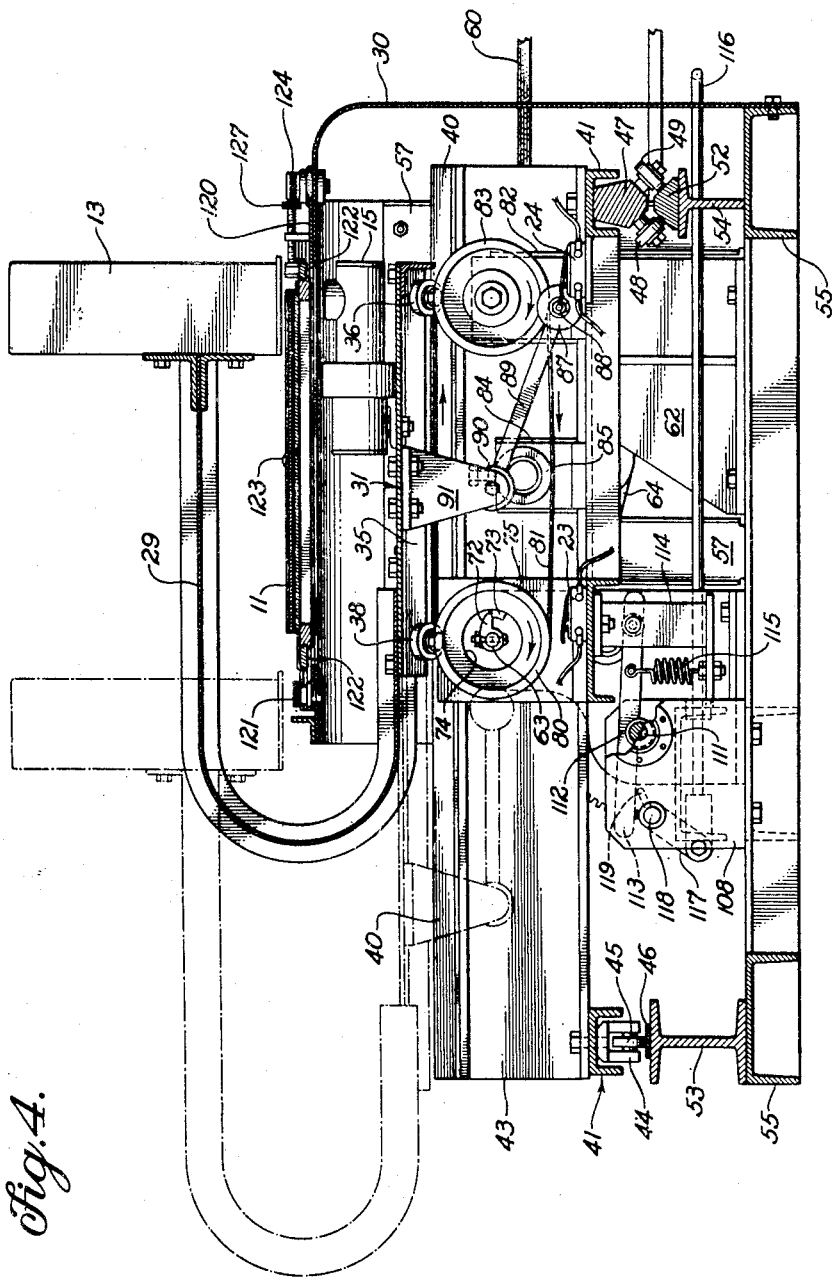
Fig. 4 is a sectional view taken on line 4—4 of Fig. 3.

Carriage 41 likewise is adapted to move along a three point suspension in order substantially to eliminate friction and vibration. For this purpose, it may be provided with a suitable bracket 44 attached adjacent one edge of the underside of the carriage and near the transverse center line thereof. As best shown in Figs. 4 and 5, bracket 44 supports a substantially frictionless roller 45 adapted to roll along a stationary track 46 and thus provides one of the three point suspensions of the carriage.

Adjacent the opposite underside edge of carriage 41, a boss support 47 having a generally triangular lower portion is mounted. At spaced points near the ends of this boss support are two pairs of substantially frictionless rollers 48—49 and 50—51 respectively, providing the other two of the three point supports for the carriage. These rollers are adapted to roll along the opposite sides of a cooperating track 52 of triangular cross section for the reason described above with respect to track 40.

Stationary tracks 46 and 52 may be supported by structural members 53 and 54 of sufficient height to provide working space for the actuating means for the carriages and these structural members may be mounted upon any suitable stationary base supports 55. Attached to the stationary base supports in any suitable manner is a pair of removable end sections 56 and 57 of the stationary housing 30. These sections may be detachably fastened to the housing 30 in any suitable manner and removed when desired to lubricate, inspect, or repair the interior parts of the structure. Housing 30, as will be noted, serves as a shield for the moving carriages as well as a convenient support for the stationary film and negatives above described. It will further be obvious that in the event it is desired to make the entire apparatus easily transportable, suitable means such as a sled or roller mounting (not shown) may be provided for the entire apparatus without departing from the invention.

Referring now to the actuating means for the movable carriages, power from an outside source (not shown), supplied by any suitable means such as a belt 60, best shown in Fig. 6, is applied to a conventional pulley 61 rotatably mounted upon a stationary vertical plate 62 which is securely fastened to base support 55. Plate 62 is positioned within the detachable shield section 57 and provides a rigid mounting for the pulley 61 which in turn drives a main power shaft 63 through the intermediary of a second belt 64 and a second pulley 65. The second pulley 65 may be keyed rigidly to shaft 63 which is mounted in suitable bearings 66 and 67. Bearing 66 may be mounted in the end wall section 57 and bearing 67 may be mounted in a supporting wall 68 fixed at its lower portion to the base support 55, as best shown in Fig. 3. Suitable means for placing and maintaining a desired tension upon belt 64 and comprising an idler pulley 78 mounted upon a bell crank 69 pivoted to plate 62 at point 79 may be provided, as shown in Fig. 6. The lower end of bell crank 69 may have conventional detent means 70 adapted to engage in a selected one of a series of holes arranged on plate 62 for the purpose of maintaining a selected tension upon belt 64.

Fastened to main drive shaft 63 at a suitable point is a pinion gear 71 adapted to drive a second drive shaft through a conventional gear differential and shifting means later to be described. As will be noted from Figs. 3 and 5, main drive shaft 63 extends as a cantilever beam outwardly from bearing 67 and carries an adjustable contact arm 72 at the farther end of the shaft. This arm may be adjusted into any desired fixed angular position and cooperates with an elongated abutment 73 mounted on the interior of a freely revolving cylindrical carriage drive drum 74. Drum 74 is mounted interiorly of two pillow blocks serving as bearing supports 75 and 76 rigidly attached to longitudinally movable carriage 41, and although the position of the drum 74 shifts longitudinally with respect to the end of the drive shaft 63, a constant engagement of the shaft through contact of the arm 72 and the elongated abutment 73 within said drum is maintained in all positions.

At the end of drum 74 and preferably integral therewith is a pulley means 80 driving a flexible but strong metallic belt 81. Supported by bracket 82 on a cross strut of carriage 41 is a support pulley 83 for the belt 81, while mounted upon a second bracket 84 is an idler pulley 85 for maintaining a tension upon the inner surface of the metallic belt.

Projecting to one side of the metallic belt 81 and rigidly fixed thereto is a rigid actuating arm 86, best shown in Figs. 3 and 7. This arm carries a connecting rod bearing 87 intermediate the ends of the arm and terminates as a switch contacting element 88. A connecting rod 89 has one end mounted in bearing 87 and the other end mounted in a bearing 90 carried by a bracket 91 fastened to the underside of transverse carriage 31. As will now become apparent, rotary motion imparted to drive shaft 63 turns drum 74 and pulley 80 which in turn drives metallic belt 81 (as shown by arrows in Fig. 4) and through actuating arm 86 on said belt effects a reciprocating motion of transverse carriage 31 regardless of the position of the longitudinal carriage 41 upon which the transverse carriage is supported. As will also be noted, the switch actuating end 88 of arm 86 periodically contacts switches 24 and 23 in sequence at the ends of the strokes of transverse carriage 31 with the result that the source of light to scanning elements 13 and 14 may be interrupted and re-established at the desired times through any suitable electrical wiring not shown, for clarity, in the mechanical figures of the drawings.

The method and means for driving the longitudinal carriage 41 in timed relation to the transverse carriage 31 may be noted by reference to Figs. 3, 5, and 6, in which it will be noted that pinion gear 71 on main drive shaft 63 is constantly in engagement with a spur gear 100 mounted upon fixed stub shaft 101 directly below main shaft 63 (Fig. 6). Selective gears 102 and 103 on said stub shaft can be engaged respectively with selective gears 104 and 105 on slotted drive shaft 106 by operation of a conventional gear shift lever 107. As will be obvious the speed at which shaft 106 is driven can thus be selectively varied. If desired, any suitable external shield means (not shown) may be detachably affixed to the stationary housing 30 to provide a cover for the moving belts and gears.

Drive shaft 106 may be mounted in suitable bearing brackets 108 and 109 rigidly fastened to the stationary base plate 55 (Fig. 3) and in a bearing 110 positioned in the end wall of the housing (Fig. 5). Preferably, drive shaft 106 is designed with an elongated worm section 111 along which a worm gear, preferably in the form of a traveling half nut 112 (Fig. 8), mounted upon lever arm 113, is adapted to move. As shown by Fig. 4, one end of lever 113 is mounted on L-shaped bracket 114 depending from the lower side of longitudinally movable carriage 41, and interposed between the lower part of this bracket and the lever arm 113 is a tension spring 115 acting to hold the traveling nut 112 in engagement with the worm shaft 111. For engaging or disengaging carriage 41 and drive shaft 111, a manually operable rod 116 extending to the exterior of the structure is provided. This rod is connected at one end to a crank arm 117 which is rigidly attached to rod 118 mounted in brackets 108 and 109 (Fig. 5). Attached to rod 118 intermediate its ends is an elongated blade 119 adapted to contact and raise the end of lever arm 113 at any point of movement of said arm 113 along the worm 111 and thus to raise half nut 112 out of engagement with driving worm 111. When carriage 41 therefore has reached the leftmost point of its travel, as shown in Fig. 5, actuation of lever arm 113 disengages the carriage 41 from its drive shaft, whereupon its can be quickly pushed manually or otherwise back to its righthandmost point of travel in readiness for the next cycle of operation.

Referring now to Fig. 2, it will be noted that the negative 11, which is to be calibrated in position with the negative 12, is provided with an adjustable framework 120 which is pivotally mounted upon a pin 121 mounted upon a stationary cover 30. By means of longitudinal tracks 122 and a screw adjusting means 123 the position of the negative in the angularly movable holder 120 may be adjusted longitudinally of the cover 30. External frictional means 124 of any suitable construction cooperating with the curved external edge of frame 120 serves to give and to maintain any limited angular adjustment of said negative. By means of transverse tracks 125 and 126, the longitudinal tracks of the framework may be actuated through screw adjusting means 127.

Having thus described the component parts of my apparatus, the operation of the same will now become evident. Assuming that it is desired to make a photographic record on film 10 showing by differential photometry the contrast between similar images on two properly positioned negatives 11 and 12, and with the longitudinal carriage 41 at its extreme right position as shown in Fig. 3 and with the transverse carriage 31 at its extreme position as shown in Fig. 4, the following sequence of steps will be followed. The electrical connection to switches 23 and 24 will be established by a suitable external switch means 99; rod 116 will be pushed inwardly (to the left as shown in Fig. 4) so as to engage the lower carriage 41 driving arm 113 with worm shaft 111. Upon application of power by belt 60, main drive shaft 63 through drum 74 and belt 81 causes the switch contacting element 88 of drive arm 86 to contact switch 24, causing pencils of light to pass from scanners 13 and 14 through negatives 11 and 12, on to receivers 15 and 16 and thence to projector 20, all as diagrammatically shown by Fig. 1. At the same time, arm 86 through connecting rod 89 moves transverse carriage 31 relatively to the stationary negatives and film at a substantially constant speed, and as soon as the switch contacting element 88 of arm 86 reaches switch 23, it contacts that switch causing the light of scanners 13 and 14 to be cut off temporarily. As belt 81 continues to move over the pulley 80 and along its upper traverse, carriage 31 is returned to its starting position whereupon light switch 24 again is contacted by the switch contacting element 88 of arm 86 and the next traverse of the negatives by the light from the scanners is begun.

Due to engagement of arm 113 with rotating worm gear 111, however, a predetermined small longitudinal movement of carriage 41 has taken place during the initial reciprocation of carriage 31 with the result that the second traverse of the negatives by the light from the scanners takes place along a narrow path immediately adjacent the path followed during the first traverse. As will be apparent, by suitable design of the scanners so as to provide narrow pencils of light and by suitable gears so as to provide commensurately small increments of movement of carriage 41, an exceptionally accurate resolution of the images may be effected.

As soon as the carriage 41 has moved sufficiently to the left to pass over the entire surface of the negatives to be scanned, the electrical energy to the scanners may be shut off and the rod 116 may be pulled outwardly thus disengaging carriage 41 from drive shaft 111. Carriage 41 is then moved quickly and freely back to its starting position by hand or otherwise. If desired, of course, power applied to belts 60 or 64 may be interrupted at this time during which preparations are being made for the next cycle of operations. Undeveloped film 10 may then be removed for processing and negatives 11 and 12 taken from their holders. Normally, the position of the film and the negative 12 are fixed and the second negative 11 is calibrated with the first negative by careful adjustment of the novel framework into which said first negative is fitted. When the negatives and film are then in position, the sequence of operation is again initiated as above described.

While the salient features of this invention have been described in detail with respect to one embodiment it will, of course, be apparent that numerous modifications may be made within the spirit and scope of this invention and it is not desired to limit the invention to the exact details shown except in so far as they may be defined in the following claims.

What is claimed is:

1. A comparative photometer comprising in combination, a stationary support adapted to retain thereon a film and a plurality of negatives in predetermined fixed relative positions, a first movable carriage mounted adjacent said support and movable transversely thereto, a plurality of light scanning means for directing pencils of light upon said negatives, a plurality of light receivers for receiving light passing through said negatives, a light projector connected to said light receivers and adapted to project light upon said film in dependence upon the amount of light falling upon said light receivers, said scanning means, light receivers and light projector being operatively mounted upon said first carriage for relative movement with respect to said stationary support, a second movable carriage supporting said first carriage and movable longitudinally of said stationary support and actuating means for moving said first and second carriages simultaneously.

2. A comparative photometer of the character described in claim 1, in which the mounting of said first carriage upon said second carriage includes a vertical rail attached to said second carriage and a plurality of rollers attached to said first carriage with at least one roller bearing upon opposite upstanding sides of said rail, whereby vibration of the first carriage at the extreme paths of travel of said second carriage is substantially eliminated.

3. A comparative photometer of the character described in claim 1, in which the mounting of said first carriage upon said second carriage includes a vertical rail attached to the second carriage, a second rail attached to the second carriage, a plurality of sets of rollers attached to said first carriage with at least one roller of each set bearing upon opposite upstanding sides of said first-mentioned rail, and a separate roller attached to the first carriage and bearing upon said second rail.

4. Apparatus of the class described comprising a stationary housing having a surface upon which objects may be positioned in a first plane for purposes of comparison, a first reciprocable carriage mounted within said housing and adapted to support means for scanning said objects, said first carriage being movable in a second plane adjacent said first plane, a second reciprocable carriage supporting said first carriage and adapted to move substantially normally to the path of movement of said first carriage, actuating means for said first carriage including a rotatable shaft mounted at one end adjacent said housing and having its second end projecting interiorly of said housing, an arm affixed to said second end of the shaft, a hollow drum mounted upon said second carriage and adapted to rotate freely within said mounting during reciprocation of the second carriage with respect to the shaft, an abutment disposed within the drum and adapted to be engaged by said shaft arm, drive means connecting said drum and said first carriage thereby to reciprocate the first carriage upon rotation of the shaft, and means for driving the shaft and moving the second carriage simultaneously.

5. Apparatus as described in claim 4, wherein said drive means comprises a belt carrying a connecting rod attached to a crosshead on said first carriage.

6. Apparatus as described in claim 4, wherein said shaft is provided with gearing adapted to drive said second carriage.

7. Apparatus as described in claim 4, wherein said shaft is provided with gearing adapted to drive said second carriage through the intermediary of a selectively disengageable gear.

8. Apparatus of the class described comprising a stationary support adapted to receive a horizontally positioned photographic film and a plurality of horizontally spaced photographic negatives, a light scanner and a light receiver disposed on opposite sides, respectively, of each of said negatives, a light impulse projector disposed on one side of said film and connected to said light receivers for projecting light upon said film in dependence upon the amount of light falling upon said light receivers, said scanners, receivers and projector being mounted on a first carriage constituting a common support which is reciprocably movable in a horizontal plane vertically spaced from said film and negatives, a second carriage supporting said first carriage and movable horizontally in a direction which is normal to the direction of movement of said first carriage, separate drive shafts for each carriage connected to a power source, actuating means for driving said shafts simultaneously and disengaging means for disconnecting said second carriage from its drive shaft, whereby said second carriage may be moved quickly to a retracted position.

9. Apparatus of the class described comprising a stationary support adapted to receive a horizontally positioned photographic film and a plurality of horizontally spaced photographic negatives, a light scanner and a light receiver disposed on opposite sides, respectively, of each of said negatives, a light impulse projector disposed on one side of said film and connected to said light receivers for projecting light upon said film in dependence upon the amount of light falling upon said light receivers, said scanners, receivers and projector being mounted on a first carriage constituting a common support which is reciprocably movable in a horizontal plane vertically spaced from said film and negatives, a second carriage supporting said first carriage and movable horizontally in a direction which is normal to the direction of movement of said first carriage, a drive shaft for the first carriage, a pulley attached to said shaft, a belt driven by said pulley, connecting means between said belt and carriage whereby said belt imparts a reciprocating motion to said carriage, a drive shaft for said second carriage and a power source connected to each drive shaft for driving the same simultaneously.

10. In a comparative photometer assembly of the character described in claim 9, a first switch mounted upon the second carriage and connected to the photometric means for initiating a source of light thereto, a second switch mounted upon the second carriage and connected to the photometric means for stopping a source of light thereto and contact means attached to said belt and adapted serially to make and break contact with the first and second switches whereby light falls upon the negatives during the reciprocation of the first carriage in one direction only.

11. Apparatus of the class described comprising a stationary support adapted to receive a horizontally positioned photographic film and a plurality of horizontally spaced photographic negatives, a light scanner and a light receiver disposed on opposite sides, respectively, of each of said negatives, a light impulse projector disposed on one side of said film and connected to said light receivers for projecting light upon said film in dependence upon the amount of light falling upon said light receivers, said scanners, receivers and projector being mounted on a first carriage constituting a common support which is reciprocably movable in a horizontal plane vertically spaced from said film and negatives, a second carriage supporting said first carriage and movable horizontally in a direction which is normal to the direction of movement of said first carriage, a worm drive shaft for the second carriage, a worm gear connected to said second carriage and adjustably engaging said worm drive shaft, a power source connected to each drive shaft for driving the same simultaneously, and disengaging means for moving said worm gear out of engagement with the worm drive shaft, whereby the second carriage may be moved quickly to a retracted position.

12. In a comparative photometer assembly of the character described in claim 11, a lever arm attached adjacent one end of said second carriage and carrying said worm gear intermediate its ends, a spring normally holding said worm gear in contact with said worm shaft and lifting means actuated by the disengaging means for lifting said worm gear out of contact with the worm shaft against the action of said spring.

ALBERT A. BROWN.

REFERENCES CITED

The following references are of record in the file of this patent:

UNITED STATES PATENTS

| Number | Name | Date |
| --- | --- | --- |
| 736,064 | Burnett | Aug. 11, 1903 |
| 1,812,764 | Story, Jr. | June 30, 1931 |
| 1,917,379 | Lowry | July 11, 1933 |
| 2,184,157 | Jones | Dec. 19, 1939 |
| 2,184,159 | Stockbarger et al. | Dec. 19, 1939 |
| 2,185,139 | Wurzburg, Jr. | Dec. 26, 1939 |
| 2,215,224 | MacMillan | Sept. 17, 1940 |
| 2,238,762 | Whitaker | Apr. 15, 1941 |
| 2,269,161 | Morse | Jan. 6, 1942 |
| 2,291,114 | Squyer | July 28, 1942 |
| 2,319,898 | Zurian | May 25, 1943 |
| 2,444,675 | Roth | July 6, 1948 |
| 2,467,057 | Simmon | Apr. 12, 1949 |
| 2,478,555 | Yule | Aug. 9, 1949 |